Patented June 8, 1937

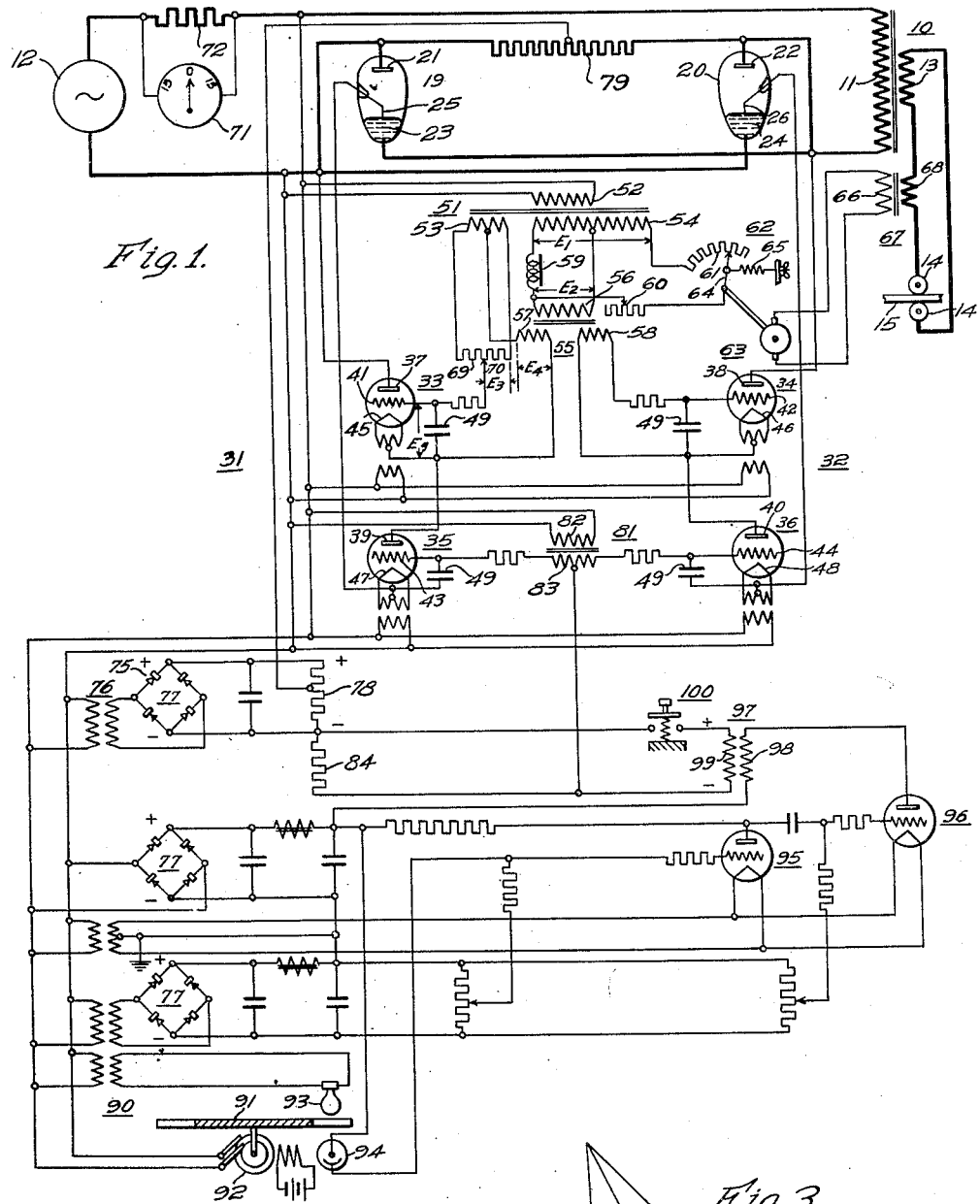

2,083,190

UNITED STATES PATENT OFFICE 2,083,190

WELDING APPARATUS

John W. Dawson, Wilkinsburg, Pa., assignor to Westinghouse Electric & Manufacturing Company, East Pittsburgh, Pa., a corporation of Pennsylvania Application May 31, 1934, Serial No. 728,363

28 Claims. (Cl. 250—27)

My invention relates, generally, to electric welding apparatus and systems and it has particular relation to resistance welding apparatus and systems.

The object of my invention, generally stated, is to provide a resistance welding system which shall be simple and efficient in operation and which may be readily and economically manufactured and installed.

The principal object of my invention is to provide for controlling the flow of current in an electric circuit such as a resistance welding circuit.

An important object of my invention is to provide for supplying a predetermined number of half cycles of alternating current to perform a welding operation beginning at a predetermined time in each half cycle.

Another important object of my invention is to provide for preventing the flow of alternating current in an electric power circuit until the occurrence of a predetermined time in each half cycle during which the current is to be supplied to the load.

A further object of my invention is to provide for controlling the flow of welding current in a welding circuit in accordance with the characteristics of the load in order to maintain the flow of welding current substantially constant.

Still another object of my invention is to provide for symmetrically applying control voltages to space-discharge devices connected to control the functioning of a resistance welding system.

A still further object of my invention is to provide for independently biasing space discharge devices connected to opposite polarities to render them non-conducting and for commonly rendering them conducting.

Other objects of my invention will in part be obvious and in part appear hereinafter.

My invention accordingly is disclosed in the embodiment hereof shown in the accompanying drawings and comprises the features of construction, combination of elements and arrangement of parts which will be exemplified in the construction hereinafter set forth and the scope of the application of which will be indicated in the appended claims.

For a more complete understanding of the nature and scope of my invention, reference may be had to the following detailed description taken in connection with the accompanying drawings, in which:

Figure 1 illustrates diagrammatically a control system organized in accordance with my invention;

Figs. 2 and 3 illustrate vectorially the relationship existing between certain voltages employed for effecting certain control functions.

Figure 4:
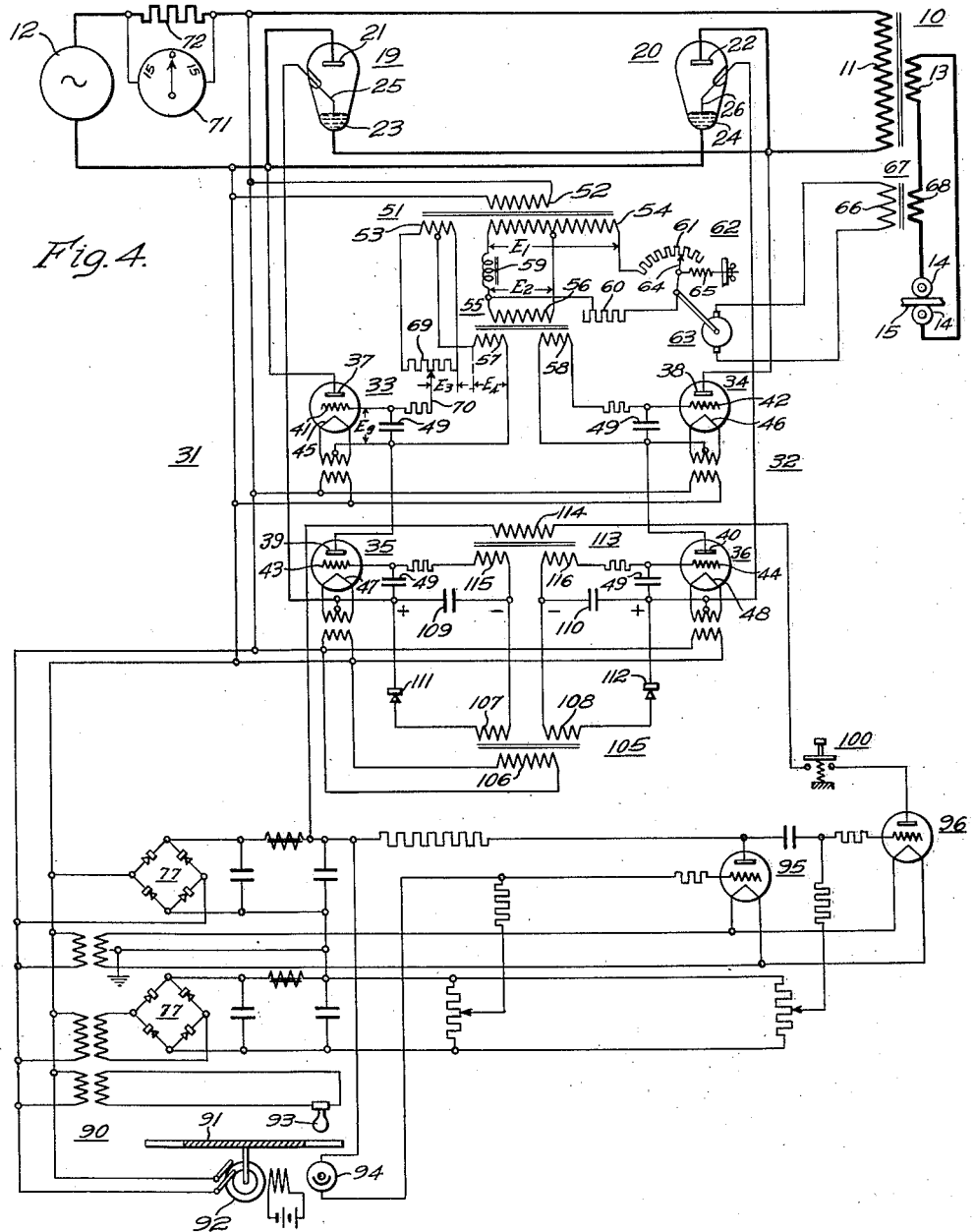
Fig. 4 illustrates diagrammatically another embodiment of my invention.

In the resistance welding systems illustrated and described herein, I have provided a pair of inversely connected arc discharge devices for controlling the flow of welding current from an alternating current source to the welding circuit. Each of the arc discharge devices may comprise an anode, a mercury pool cathode, and a control electrode. It is a characteristic of these devices that they will conduct current in one direction only and for a time which is no longer than one-half cycle of the alternating current unless, during the next half cycle for which they would normally be non-conducting, they are again ignited.

In order to ignite the arc discharge devices to render them conducting, a pair of series connected space discharge devices is connected between the anode and control electrode of each of the arc discharge devices. One of the space discharge devices of each pair is controlled by means of a phase shifting circuit while the other space discharge device of each pair may be controlled by a photo-electric timer system or by any other control system which will render them conducting at the desired time.

The series connected space discharge devices are provided in order to decrease the tendency for the control circuit to shunt some of the main current which would otherwise be carried by the arc discharge devices. More particularly, however, the series connected space discharge devices are used in order to obtain a more accurate control of the time during which the arc discharge devices are conducting.

The photo-controlled space discharge devices are arranged to be conducting at some time prior to the instant of time when the phase shift controlled space discharge devices are rendered conducting. It is then unnecessary to adjust the photo-electric control system to provide the required accurate timing since it is provided by the phase shift controlled space discharge devices. Inherently, the phase shift control circuit is capable of providing a more accurate timing for the operation of the arc discharge devices than may be obtained with the photo-electric control system since the former is a completely electrical timing means while the latter is largely mechanical, requiring the use of a reduction gearing mechanism and other mechanical details. Moreover, it permits a certain latitude in the adjustment of the relative timing of the control circuits for each of the arc discharge devices in order to compensate for unsymmetrical characteristics which may be present.

It is well known that the impedance of the welding circuit changes while the welding operation is being performed due to the variable effect of the material being welded in its movement between the welding electrodes. It is desirable to maintain the welding current substantially constant in order to obtain uniform welding procedure and for this purpose, a load responsive circuit is provided which is arranged to automatically control the phase shift circuit so that the arc discharge devices will be caused to become conducting either earlier or later in each half cycle in order to increase or decrease the time during which the welding current is applied in order to effect a substantially constant value of welding current.

I have found that it is desirable to apply the control and biasing potentials to the grids of the photo-controlled space discharge devices over symmetrical circuits in order to provide for more uniform operation. Such circuits are provided by connecting a resistor between the anodes of the arc discharge devices and a secondary winding of a grid transformer to the grids of the photo-controlled space discharge devices. The grid biasing potentials are then applied between the mid-points of the resistor and the secondary winding to effect the desired control functions. In a further embodiment of the invention I have provided for independently applying the biasing potentials to the grids of the photo-controlled space discharge devices to maintain them in the non-conducting state while commonly applying the control potential for rendering them conducting.

Referring now particularly to Fig. 1 of the drawings, the reference character 10 designates, generally, a welding transformer having a primary winding 11 which is connected to be energized from a source of alternating current 12 which may be a 60-cycle generator. The welding transformer 10 is also provided with a secondary winding 13 which is connected to supply current to the welding circuit including the electrodes 14 between which work 15 on which the welding operation is to be performed may be placed. The welding electrodes 14 are illustrated in the drawings as being rollers. However, it will be understood that any other suitable type of welding electrodes may be used without departing from the scope of this invention.

In order to control the flow of welding current to the welding circuit, a pair of inversely connected arc discharge devices of the ignition type, shown generally at 19 and 20, is provided and is connected between and primary winding 11 of the welding transformer 10 and the alternating current source 12. Each of the electric valve devices 19 and 20 comprises respectively, anodes 21 and 22, mercury pool cathodes 23 and 24 and control electrodes 25 and 26. When current is caused to flow from the anodes 21 and 22 through the control electrodes 25 and 26 into the mercury pool cathodes 23 and 24, cathode spots are formed on the latter which will cause the arc discharge devices 19 and 20 to become conducting when thus ignited provided that the proper polarity, for which they are adapted to be conducting, is applied thereto. In other words, each of the arc discharge devices 19 and 20 will become conducting on the application of the proper polarity or half cycle thereto, provided that the cathode spot is formed in the half cycle for which either of them is adapted to become conducting. The arc discharge devices 19 and 20 will remain in the conducting state until the end of a half cycle and will not again become conducting unless in a succeeding half cycle, the cathode spot is formed as described herein.

In order to energize the control electrodes 25 and 26 for the purpose of forming the cathode spots in the arc discharge devices 19 and 20, control circuits, shown generally at 31 and 32, are provided. The circuits 31 and 32 comprise space discharge devices 33 and 34, respectively, which are controlled by means of a phase shifting circuit and also space discharge devices 35 and 36 which are disposed to be controlled by means of a photo-timer circuit. As illustrated, each of the space discharge devices 33, 34, 35 and 36 is provided, respectively, with anodes 37, 38, 39 and 40, grids 41, 42, 43 and 44 and hot cathodes 45, 46, 47 and 48. As illustrated, a capacitor 49 is connected between each of the grids 41, 42, 43 and 44 and its respective cathode 45, 46, 47 and 48, in order to maintain the former at a predetermined potential relative to the latter.

As set forth hereinbefore, the space discharge devices 33 and 34 are controlled by means of a phase shifting circuit. This circuit is energized by means of a phase shifting transformer shown generally at 51 and comprising a primary winding 52, which is connected to be energized from the alternating current source 12, and secondary windings 53 and 54. A phase shift grid transformer 55 is provided having a primary winding 56 which is disposed to be energized from the secondary winding 54 of the phase shift transformer 51. The phase shift grid transformer 55 is provided with secondary windings 57 and 58 which are connected, respectively, to the grids 41 and 42 of the space discharge devices 33 and 34, for applying thereto the proper energizing potential.

It will be observed that the primary winding 56 of the phase shift grid transformer 55 is connected to the secondary winding 54 through a phase shifting network comprising an inductor 59 and adjustable resistors 60 and 61. The times at which the grids 41 and 42 have applied thereto the proper energizing potential will depend upon the adjustment of the resistors 60 and 61, as will be readily understood.

In order to maintain the flow of current in the welding circuit substantially constant, a load responsive circuit shown generally at 62 is provided which includes the adjustable resistor 61. A torque motor 63 is provided for rotating an arm 64 of the resistor 61 against the force of a biasing spring 65. The motor 63 is arranged to be energized from the secondary winding 66 of a current transformer shown generally at 67, the primary winding 68 of which is connected in the welding circuit. The motor 63 is so arranged as to decrease the resistance in the phase shift control circuit on increase in welding current in order to shift the phase of the energizing potential applied to the grids 41 and 42 so that the arc discharge devices 19 and 20 will be rendered conducting later in their particular half cycles. In like manner, when the current in the welding circuit falls below a predetermined value, the motor 63 is arranged to permit an increase in the resistance provided by the adjustable resistor 61 in order to advance the phase of the biasing voltage applied to the grids 41 and 42, so that the arc discharge devices 19 and 20 will become conducting earlier in their individual half cycles.

I have found that it is desirable to provide for altering the relative time in each half cycle at which the space discharge devices 33 and 34 are rendered conducting. Such adjustment is desirable in order to compensate for certain unsymmetrical characteristics in the arc discharge devices 19 and 20 which may be present due to lack of uniformity in their manufacture and construction. For this purpose, I have provided a potentiometer 69 which is connected across the secondary winding 53, as illustrated. One terminal of the secondary winding 57 is connected to a mid-tap of the secondary winding 53 and the grid 41 is connected, as shown, to the potentiometer 69 by means of the arm 70. By altering the position of the arm 70 along the potentiometer 69, it is possible to cause the space discharge device 33 to be rendered conducting either earlier or later than the space discharge device 34 is rendered conducting in a succeeding half cycle, since the proper energizing potential is supplied to their respective grids 41 and 42 during each succeeding half cycle.

The unsymmetrical conducting characteristics will be manifested by the flow of direct current in the circuit to the primary winding 11 of the welding transformer 10. This direct current may be measured by a meter 71, such as a direct current milli-volt meter, which may be connected across a resistance shunt 72 in the customary manner. The meter 71 is provided with a zero center scale since, as will be readily understood, the direct current may flow in either direction.

Since it is not ordinarily desirable to have the arc discharge devices 19 and 20 conducting during each successive half cycle, but rather to have them conducting for a predetermined number of half cycles and non-conducting for a predetermined number of half cycles, the space discharge devices 35 and 36 are provided in order to effect this operation. When the devices 35 and 36 are rendered conducting, the circuit is completed between the anodes 21 and 22 and the cathodes 23 and 24 of the arc discharge devices 19 and 20, respectively, through the control electrodes 25 and 26 so that the cathode spots described hereinbefore will be formed to render the arc discharge devices 19 and 20 conducting.

In order to maintain the space discharge devices 35 and 36 in the non-conducting state, a negative potential is applied to the grids 43 and 44. This negative potential may be obtained from a grid biasing circuit, shown generally at 75 and comprising a transformer 76 and a rectifier 77. As illustrated, the rectifier 77 is connected across a resistor 78 to apply the indicated polarities to the terminals thereof.

As set forth hereinbefore, it is desirable to apply the biasing potentials to the grids 43 and 44 over symmetrical circuits. For this purpose, a resistor 79 is connected between the anodes 21 and 22 of the arc discharge devices 19 and 20. The mid-point of the resistor 79 is connected as illustrated to a point along the resistor 78. A grid transformer, shown generally at 81, having a primary winding 82 connected to the source 12 and a secondary winding 83, the terminals of which are connected to the grids 43 and 44 is provided. The use of the grid transformer 81 obviates the necessity for employing two separate control circuits for the grids 43 and 44. It will be noted that the cathode 48 of the space discharge device 36 is connected to a potential which is opposite to that of the potential to which the cathode 47 of the space discharge device 35 was connected. The grid transformer 81 reduces the cathodes 47 and 48 to the same potential insofar as the grids 43 and 44 are concerned.

The negative biasing direct current potential, as obtained from the biasing circuit 75, is applied through a resistor 84 to a mid-tap of the secondary winding 83. It will be observed that the control circuit for applying the biasing potential to the grids 43 and 44 is connected between the mid-point of the resistor 79 and the mid-tap of the secondary winding 83. This circuit arrangement permits the application of the same biasing potential to each of the grids 43 and 44 and eliminates any unsymmetrical application of biasing potential.

In order to render the space discharge devices 35 and 36 conducting, a positive ionizing potential is applied to the grids 43 and 44 to overcome the negative potential which is normally applied thereto. Advantage is taken of this fact in order to provide the desired timing for the operation of the arc discharge devices 19 and 20.

A photo-electric system, shown generally at 90, may be provided comprising a disk 91 which is arranged to be rotated by means of a synchronous motor 92. The photo-electric system 90 may be constructed in accordance with the teachings of the co-pending application of Edwin H. Vedder, Serial No. 710,095, filed February 1, 1934 and assigned to the assignee of this application. The disk 91 is provided with teeth around its periphery which are arranged to intercept the rays of light from a light source 93 as they fall on a photo-cell 94 each tooth corresponding to a half cycle of the alternating current from the source 12. The photo-cell 94 is connected in the grid circuit of an amplifying tube 95, the output of which is applied to a timer control tube 96. An impulse transformer shown generally at 97 and comprising a primary winding 98 connected in the plate circuit of the timer control tube 96 is provided. The secondary winding 99 of the impulse transformer 97 is connected through a push button control switch 100 across the resistor 84. The polarity of the impulse appearing at the terminals of the secondary winding 99 is such as to oppose the potential applied to the resistor 84 and in addition to overcome it so that a positive potential is applied to the grids 43 and 44. As set forth in the copending application of Vedder, means are provided for blocking out certain of the slots between the teeth of the disk 91 so that the arc discharge devices 19 and 20 will not be rendered conducting during half cycles of the alternating current corresponding to the slots blocked out.

As illustrated, any suitable circuits may be provided for applying the proper potentials to the elements of the amplifier tube 95 and the timer control tube 96. Since the circuits shown in the drawings are typical and well known to those skilled in the art, a description thereof will not be set forth herein.

In order to more fully understand the function of the phase shift control system, reference may be had to the vector diagrams shown in Figs. 2 and 3. These diagrams show the relationship of certain voltages and the reference characters which are applied to the vectors have been applied to the circuit connections to illustrate more clearly the presence of the various voltages.

Referring particularly to Fig. 2 of the drawings, the vector $E_1$ represents the voltage which appears across the terminals of the secondary winding 54. The vector $E_2$ represents the voltage which is applied to the primary winding 56 of the phase shift grid transformer 55, as a result of the application of the voltage $E_1$ to the phase shifting network comprising the inductor 59 and adjustable resistors 60 and 61. The position of the vector $E_2$ is altered in accordance with the load, as described hereinbefore, as the resistor 61 is adjusted by the torque motor 63. Correspondingly, the phase relation of the biasing voltages applied to the grids 41 and 42 of the space discharge devices 33 and 34 will be altered.

In the vector diagram shown in Fig. 3 of the drawings, the vector $E_4$ represents the voltage which appears across the terminals of the secondary winding 57. This voltage corresponds to the voltage $E_2$ of the vector diagram shown in Fig. 2. The vector $E_3$ represents a voltage which may be obtained by means of the potentiometer 69 and the combination of the vectors $E_3$ and $E_4$ is represented by the vector $E_g$ which represents the voltage that is applied to the grid 41. Depending upon the position of the arm 70, the vector $E_3$ may assume the position of the vector $E'_3$ and the resulting voltage will be $E'_g$ as will be readily understood. It is, therefore, possible to shift the phase relationship of the ionizing voltage applied to the grid 41 either ahead or behind the time when the ionizing voltage is applied to the grid 42.

In operation, assuming that the proper adjustments of the resistor 60 and the potentiometer 69 have been made so that the space discharge devices 33 and 34 are rendered conducting at the proper times and that the system is properly energized, the operator may initiate the operation of the system by depressing the push button switch 100. The light rays which are permitted to impinge on the photo-cell 94 cause an impulse to be applied to the amplifier tube 95 which is amplified thereby and applied to the timer control tube 96. This impulse appears across the terminals of the secondary winding 99 of the impulse transformer 97 and is applied to the grids 43 and 44 of the space discharge devices 35 and 36, respectively.

Assuming that the space discharge device 35 will become conducting on the application of the first impulse, the arc discharge device 19 will not be rendered conducting until the space discharge device 33 is rendered conducting by the application of the proper ionizing voltage to the grid 41. When the proper ionizing voltage is applied to the grid 41, both of the space discharge devices 33 and 34 will become conducting to permit the flow of current to the control electrode 25 to form the cathode spot for igniting the arc discharge device 19 and rendering it conducting.

In like manner, the next impulse appearing across the secondary winding 99 of the impulse transformer 97 will be in proper time to complete a corresponding sequence of functioning of the space discharge devices 34 and 36 for rendering the arc discharge device 20 conducting.

In order to avoid saturation of the welding transformer 10, it is always desirable to have the arc discharge devices 19 and 20 conducting for an even number of successive half cycles. The slots and teeth of the disk 91 are properly arranged to provide for this functioning. If such operation is not effected, there is a possibility that large direct current components of the alternating current will be caused to flow in the primary winding of the welding transformer 10 with the result that the system may be overloaded.

As long as the operator holds the control switch 100 in the closed position, welding current will be passed between the welding electrodes 14 and through the work 15 for a predetermined number of cycles and will be cut off for a predetermined number of cycles. As soon as the control switch 100 is released, the welding current will cease to flow at the expiration of the next succeeding half cycle.

Referring now to Fig. 4 of the drawings, it will be observed that the embodiment of my invention there shown is generally similar to that shown in Fig. 1. The circuit connections are identical except for the circuits which are used in connection with the controlling of the grids 43 and 44 of the space discharge devices 35 and 36, which are controlled by the photo-electric system 90. In the system shown in Fig. 4, an individual biasing circuit is provided for each of the grids 43 and 44 in order to apply thereto the necessary negative potential for rendering the space discharge devices 35 and 36 non-conducting. It is then unnecessary to provide the resistor 79 and the grid transformer 81, together with the grid biasing circuit 75 as shown in Fig. 1.

In order to provide for individually biasing the grids 43 and 44, a transformer, shown generally at 105, is provided having a primary winding 106 which may be connected for energization to the alternating-current source 12. The transformer 105 is provided with secondary windings 107 and 108, which are connected, respectively, across capacitors 109 and 110 through rectifiers 111 and 112. The rectifiers 111 and 112 are so connected as to permit the application of potentials to the capacitors 109 and 110 having polarities as indicated. In effect, the capacitors 109 and 110 are, respectively, connected between the grids 43 and 44 and their corresponding cathodes 47 and 48.

The negative potential which is thus applied is sufficient to maintain the space discharge devices 36 and 37 in the non-conducting state. Although the space discharge devices 35 and 36 are connected in the main circuit to the arc discharge devices 19 and 20 at points of opposite potential, it is unnecessary to take this into consideration in view of the fact that the secondary windings 107 and 108 are electrically insulated from each other. The independent biasing circuits may be more preferable than the corresponding circuits shown in Fig. 1 of the drawings, in view of the fact that they are less subject to the effect of transient phenomena, which, in certain instances, may cause improper biasing potentials to be applied to the grids 43 and 44.

The control of the grids 43 and 44, in order to render the space discharge devices 35 and 36 conducting, is effected in a manner similar to that described hereinbefore. An impulse transformer, shown generally at 113, is provided having a primary winding 114 connected in the plate circuit of the timer control tube 96. The transformer 113 is also provided with secondary windings 115 and 116, each of which is individual, respectively, to the grids 43 and 44. The control impulse which is applied to the grids 43 and 44 on the closure of control switch 100 is sufficient to overcome the negative potential applied thereto through the rectifiers 111 and 112, and further is sufficient to apply a positive biasing potential to render the space discharge devices 35 and 36 conducting.

In view of the fact that the details of operation of the system shown in Fig. 4 will be essentially the same as described in connection with the system shown in Fig. 1, except as modified by the individual biasing circuits for the space discharge devices 35 and 36, a detailed description thereof will not be set forth.

Since certain further changes may be made in the foregoing construction and different embodiments of the invention may be made without departing from the scope thereof, it is intended that all matter shown in the accompanying drawings or set forth in the above description shall be interpreted as illustrative and not in a limiting sense.

I claim as my invention:

1. An electric power system comprising, in combination, a load circuit, circuit means connecting the load circuit to a source of alternating current, electric valve means connected to control the flow of current in said load circuit, means for rendering said valve means conducting during periods comprising a predetermined number of half cycles of the alternating current, said valve means being non-conducting during the intervening periods and purely electrical means for rendering said valve means conducting at a predetermined time in any of said half cycles of the alternating current.

2. An electric power system comprising, in combination, a load circuit, circuit means connecting the load circuit to a source of alternating current, electric valve means connected to control the flow of current in said load circuit, space discharge means connected to render said electric valve means conducting during a predetermined number of cycles of the alternating current, and additional space discharge means connected to prevent the ignition of said electric valve means until the occurrence of a predetermined time in each cycle.

3. An electric power system comprising, in combination, a load circuit, circuit means connecting the load circuit to a source of alternating current, electric valve means connected to control the flow of current in said load circuit, a plurality of space discharge means connected in series circuit relation and disposed when all are rendered conducting to effect the ignition of said electric valve means to permit the flow of load current, means for rendering one of said space discharge means conducting during a predetermined number of cycles, and means for rendering another of said space discharge means conducting at a predetermined time in any cycle.

4. An electric power system comprising, in combination, a load circuit, circuit means connecting the load circuit to a source of alternating current, electric valve means connected to control the flow of current in said load circuit, a plurality of space discharge means connected in series circuit relation and disposed when all are rendered conducting to effect the ignition of said electric valve means to permit the flow of load current, and means for sequentially rendering said space discharge means conducting.

5. An electric power system comprising, in combination, a load circuit, circuit means for connecting the load circuit to a source of alternating current, a pair of inversely connected electric valve devices connected to control the flow of current in said load circuit, a control electrode individual to each electric valve device, and space discharge means individual to each control electrode and disposed to be responsive to a plurality of independent conditions for energizing said control electrodes to render said electric valve devices conducting on the occurrence of said conditions thereby permitting the flow of load current.

6. An electric power system comprising, in combination, a load circuit, circuit means for connecting the load circuit to a source of alternating current, a pair of inversely connected electric valve devices connected to control the flow of current in said load circuit, a control electrode individual to each electric valve device, control means disposed to effect the energization of said control electrodes during a predetermined number of half cycles of the alternating current, and additional control means purely electrical in its operation disposed to prevent the energization of said control electrodes until the occurrence of a predetermined time in any of said half cycles of the alternating current thereby rendering said valve devices conducting during a predetermined number of half cycles beginning at a predetermined time in each half cycle.

7. An electric power system comprising, in combination, a load circuit, circuit means for connecting the load circuit to a source of alternating current, a pair of inversely connected electric valve devices connected to control the flow of current in said load circuit, a control electrode individual to each valve device, space discharge means connected to energize said control electrodes to render said valve devices conducting during a predetermined number of half cycles, and additional space discharge means connected to energize said control electrodes at a predetermined time in each half cycle thereby rendering said electric valve devices conducting during a predetermined number of half cycles beginning at a predetermined time in each half cycle.

8. An electric power system comprising, in combination, a load circuit, circuit means for connecting the load circuit to a source of alternating current, a pair of inversely connected electric valve devices connected to control the flow of current in said load circuit, a control electrode individual to each electric valve device, a pair of space discharge devices connected in series circuit relation to each of said control electrodes and disposed when the devices of each pair are rendered conducting to energize the control electrode individual thereto thereby rendering the electric valve devices conducting to permit the flow of load current, and means for sequentially rendering conducting the space discharge devices of each pair of said devices.

9. An electric power system comprising, in combination, a load circuit, circuit means for connecting the load circuit to a source of alternating current, a pair of inversely connected electric valve devices connected to control the flow of current in said load circuit, a control electrode individual to each electric valve device, a pair of space discharge devices connected in series circuit relation to each of said control electrodes and disposed when the devices of each pair are rendered conducting to energize the control electrode individual thereto thereby rendering the electric valve devices conducting to permit the flow of load current, control means for rendering one of each pair of said space discharge devices conducting during a predetermined number of half cycles, and phase shift control means connected for energization to the alternating current source for rendering the other space discharge device of each pair conducting at a predetermined time in each half cycle, thereby rendering said electric valve devices conducting during a predetermined number of half cycles beginning at a predetermined time in each half cycle.

10. An electric power system comprising, in combination, a load circuit, circuit means for connecting the load circuit to a source of alternating current, a pair of inversely connected electric valve devices connected to control the flow of current in said load circuit, a control electrode individual to each electric valve device, a pair of space discharge devices connected in series circuit relation to each of said control electrodes and disposed when the devices of each pair are rendered conducting to energize the control electrode individual thereto thereby rendering the electric valve devices conducting to permit the flow of load current, control means for rendering one of each pair of said space discharge devices conducting during a predetermined number of half cycles, phase shift control means connected for energization to the alternating current source for rendering the other space discharge device of each pair conducting at a predetermined time in each half cycle thereby rendering said electric valve devices conducting during a predetermined number of half cycles beginning at a predetermined time in each half cycle, and means for relatively adjusting the times at which said last-named space discharge devices are rendered conducting.

11. An electric power system comprising, in combination, an alternating current load circuit, circuit means connecting the load circuit to a source of alternating current, electric valve means connected to conduct successive positive and negative half cycles of the alternating current in said load circuit, control electrode means in said electric valve means for rendering said electric valve means conducting to permit the flow of load current, and phase shift means connected to be energized from the source of alternating current and to effect the energization of said control electrode means at a predetermined time in any cycle of the alternating current.

12. An electric power system comprising, in combination, an alternating current load circuit, circuit means connecting the load circuit to a source of alternating current, electric valve means connected to conduct successive positive and negative half cycles of the alternating current in said load circuit, control electrode means in said electric valve means for rendering said electric valve means conducting to permit the flow of load current, phase shift means connected to be energized from the source of alternating current and to effect the energization of said control electrode means at a predetermined time in any cycle of the alternating current, and means responsive to the current flow in the load circuit for controlling the operation of said phase shift means to alter the time when said electric valve means becomes conducting to maintain the flow of load current substantially constant.

13. An electric power system comprising, in combination, a load circuit, circuit means for connecting the load circuit to a source of alternating current, a pair of inversely connected electric valve devices connected to control the flow of current in said load circuit, a control electrode individual to each electric valve device, and phase shift means connected to be energized from the source of alternating current and to effect the energization of said control electrodes at a predetermined time in each half cycle of the alternating current for rendering said electric valve devices conducting.

14. An electric power system comprising, in combination, a load circuit, circuit means for connecting the load circuit to a source of alternating current, a pair of inversely connected electric valve devices connected to control the flow of current in said load circuit, a control electrode individual to each electric valve device, phase shift means connected to be energized from the source of alternating current and to effect the energization of said control electrodes at a predetermined time in each half cycle of the alternating current for rendering said electric valve devices conducting, and means responsive to the current flow in the load circuit for controlling the operation of said phase shift means to alter the times when said control electrodes are energized to correspondingly alter the time during which said electric valve devices conduct current to maintain the flow of load current substantially constant.

15. An electric power system comprising, in combination, a load circuit, circuit means for connecting the load circuit to a source of alternating current, a pair of inversely connected electric valve devices connected to control the flow of current in said load circuit, a control electrode individual to each valve device, phase shift means connected to be energized from the source of alternating current and to effect the energization of said control electrodes at a predetermined time in each half cycle of the alternating current for rendering said valve devices conducting, and means for relatively adjusting the time in each half cycle at which said control electrodes are energized.

16. An electric power system comprising, in combination, a load circuit, circuit means for connecting the load circuit to a source of alternating current, a pair of inversely connected electric valve devices connected to control the flow of current in said load circuit, each of said electric valve devices including an anode, a cathode and a control electrode, a resistor connected between the anodes of said electric valve devices, a space discharge device connected between the anode and control electrode of each electric valve device for energizing the control electrodes to render said electric valve devices conducting, a grid in each space discharge device, a transformer having a primary winding connected to the source of alternating current and a secondary winding connected to said grids, means for applying a direct current biasing potential between the midpoint of said resistor and a midtap of the secondary winding of said transformer to render said space discharge devices non-conducting, and means for overcoming said biasing potential to render said space discharge devices conducting.

17. An electric power system comprising, in combination, a load circuit, circuit means for connecting the load circuit to a source of alternating current, a pair of inversely connected electric valve devices connected to control the flow of current in said load circuit, each of said electric valve devices including an anode, a cathode and a control electrode, a resistor connected between the anodes of said electric valve devices, a space discharge device connected between the anode and control electrode of each electric valve device for energizing the control electrodes to render said electric valve devices conducting, a grid in each space discharge device, a transformer having a primary winding connected to the source of alternating current and a secondary winding connected to said grids, a source of direct current potential, circuit means for connecting said source of direct current potential to the mid-point of said resistor and a mid-tap of the secondary winding of said transformer to apply a negative potential to said grids for rendering said space discharge devices non-conducting, and means for overcoming said negative potential and applying to said grids a positive potential to render said space discharge devices conducting.

18. An electric power system comprising, in combination, a load circuit, circuit means connecting the load circuit to a source of alternating current, a pair of inversely connected electric valve devices connected to control the flow of current in said load circuit, a control electrode individual to each electric valve device, a space discharge device individual to each control electrode, control means individual to each space discharge device for rendering them non-conducting, and timing means connected to render said space discharge devices conducting for energizing said control electrodes to render said electric valve devices conducting.

19. An electric power system comprising, in combination, a load circuit, circuit means connecting the load circuit to a source of alternating current, a pair of inversely connected electric valve devices connected to control the flow of current in said load circuit, each of said electric valve devices including an anode, a cathode, and a control electrode, a space discharge device having an anode, a cathode and a grid interposed between the anode and control electrode of each of said electric valve devices, circuit means individual to each of said grids for applying thereto a negative biasing potential to maintain said space discharge devices non-conducting, and timing means connected to overcome the negative potential on said grids to render said space discharge devices conducting for energizing said control electrodes to render said electric valve devices conducting.

20. An electric power system comprising, in combination, an alternating current load circuit, circuit means for connecting the load circuit to a source of alternating current, electric valve means connected to conduct successive positive and negative half cycles of the alternating current in said load circuit, control means for rendering said electric valve means conducting, space discharge means disposed on becoming conducting to effect the energization of said control means, and phase shift means connected to be energized from said source of alternating current for rendering said space discharge means conducting at predetermined times in each cycle of the alternating current.

21. An electric power system comprising, in combination, a load circuit, circuit means for connecting the load circuit to a source of alternating current, a pair of inversely connected electric valve devices connected to control the flow of current in said load circuit, a control electrode individual to each electric valve device, a space discharge device individual to each control electrode and disposed on becoming conducting to effect the energization of said control electrodes, and phase shift means connected to be energized from said source of alternating current for rendering said space discharge devices conducting at predetermined times in each cycle of the alternating current.

22. An electric power system comprising, in combination, an alternating current load circuit, circuit means connecting the load circuit to a source of alternating current, electric valve means connected to conduct successive positive and negative half cycles of the alternating current in said load circuit, control electrode means in said electric valve means for rendering said electric valve means conducting to permit the flow of load current, phase shift means connected to be energized from the source of alternating current and to effect the energization of said control electrode means at a predetermined time in any cycle of the alternating current, and means automatically responsive to a variable electrical characteristic of the load circuit for controlling the functioning of said phase shift means for adjusting the time in each cycle when said electric valve means is rendered conducting.

23. An electric power system comprising, in combination, an alternating current load circuit, circuit means for connecting the load circuit to a source of alternating current, a pair of inversely connected electric valve devices connected to conduct successive positive and negative half cycles of the alternating current in said load circuit, a control electrode individual to each electric valve device, phase shift means connected to be energized from the source of alternating current and to effect the energization of said control electrodes at a predetermined time in each half cycle of the alternating current for rendering said electric valve devices conducting, and means automatically responsive to a variabe electrical characteristic of the load circuit for controlling the functioning of said phase shift means to alter the times when said control electrodes are energized to correspondingly alter the time in each half cycle during which said electric valve devices conduct current.

24. An electric power system comprising, in combination, an alternating current load circuit, circuit means for connecting the load circuit to a source of alternating current, electric valve means connected to conduct successive positive and negative half cycles of the alternating current in said load circuit, control means for rendering said electric valve means conducting, space discharge means disposed on becoming conducting to effect the energization of said control means, phase shift means connected to be energized from said source of alternating current for rendering said space discharge means conducting at predetermined times in each cycle of the alternating current, and means automatically responsive to a variable electrical characteristic of the load circuit for controlling the functioning of said phase shift means for adjusting the time in each cycle when said electric valve means is rendered conducting.

25. An electric power system comprising, in combination, a load circuit, circuit means for connecting the load circuit to a source of alternating current, a pair of inversely connected electric valve devices connected to control the flow of current in said load circuit, a control electrode individual to each electric valve device, a space discharge device individual to each control electrode and disposed on becoming conducting to effect the energization of said control electrodes, phase shift means connected to be energized from said source of alternating current for rendering said space discharge devices conducting at predetermined times in each cycle of the alternating current, and means automatically responsive to a variable electrical characteristic of the load circuit for controlling the functioning of said phase shift means to alter the times when said control electrodes are energized to correspondingly alter the time in each half cycle during which said electric valve devices conduct current.

26. An electric power system comprising, in combination, a load circuit, circuit means for connecting the load circuit to a source of alternating current, a pair of inversely connected electric valve devices connected to control the flow of current in said load circuit, a control electrode individual to each valve device, phase shift means connected to be energized from the source of alternating current and to effect the energization of said control electrodes at a predetermined time in each half cycle of the alternating current for rendering said valve devices conducting, and means for relatively adjusting the time in each half cycle at which said valve devices are rendered conducting.

27. An electric power system comprising, in combination, a load circuit, circuit means connecting the load circuit to a source of alternating current, electric valve means connected to control the flow of current in said load circuit, means for rendering said valve means conducting during periods comprising a predetermined number of half cycles of the alternating current, said valve means being non-conducting during the intervening periods, and means for rendering said valve means conducting at a predetermined time in any of said half cycles of the alternating current, the last said means being of the type that is capable of rendering said valve means conducting at different predetermined times relative to the commencement of each of said half cycles.

28. An electric power system comprising, in combination, a load circuit, circuit means connecting the load circuit to a source of alternating current, electric valve means in effect consisting of a pair of discharge paths connected to control the flow of current in said load circuit, means for rendering said valve means conducting during periods comprising a predetermined number of half cycles of the alternating current, said valve means being non-conducting during the intervening periods and means for rendering said valve means conducting at a predetermined time in any of said half cycles of the alternating current, the last said means including means for so adjusting the predetermined time at which said valve means is rendered conductive in successive half-cycles as to compensate for differences in the properties of said discharge paths.

JOHN W. DAWSON.